United States Patent

[11] 3,577,094

| [72] | Inventors | Richard G. Tomlinson |
| | | Glastonbury; |
| | | Clyde O. Brown, Newington; Alan F. |
| | | Haught, Glastonbury, Conn. |
| [21] | Appl. No. | 763,222 |
| [22] | Filed | Sept. 27, 1968 |
| [45] | Patented | May 4, 1971 |
| [73] | Assignee | United Aircraft Corporation |
| | | East Hartford, Conn. |

[54] FRESNEL ZONE LASER COUPLING MIRROR
1 Claim, 8 Drawing Figs.

[52] U.S. Cl. .................................................. 331/94.5,
 350/162
[51] Int. Cl. ...................................................... H01s 3/08,
 G02b 5/18
[50] Field of Search ............................................ 331/94.5;
 350/162 (ZP), (AA abstr.), (Chem. Abstr.), (Star),
 (Phys. Abstr.)

[56] References Cited
UNITED STATES PATENTS
3,136,959 6/1964 Culver............................ 331/94.5

OTHER REFERENCES

Ronchi et al., " Laser Cavities Terminated by Diffraction Gratings," Alta Fre-Queza 33 (8), Aug. 1964, pp. 526— 533

Tremblay et al., " Simulation of ... Coaxial Apertures," App. Phip. Relt. 9, (4), 15 Aug. 66, pp. 136– 8

Strong, " Concepts of Classical Optics," Freeman & Co (San Francisco) 1958 pp. 187— 190

*Primary Examiner*—Ronald L. Wibert
*Assistant Examiner*—R. J. Webster
*Attorney*—Melvin Pearson Williams ABSTRACT: A laser cavity includes a spherical mirror and a flat mirror, the flat mirror having a plurality of holes arranged in a Fresnel zone pattern so as to provide distributed output coupling having a near-field focal point; alternatively, the flat mirror may comprise a pattern of reflecting material on a light-transmissive medium.

PATENTED MAY 4 1971

3,577,094

INVENTORS
RICHARD G. TOMLINSON
CLYDE O. BROWN
ALAN F. HAUGHT

BY Melvin Pearson Williams
ATTORNEY

3,577,094

FRESNEL ZONE LASER COUPLING MIRROR

BACKGROUND OF THE INVENTION

1. Field of Art

This invention relates to lasers, and more particularly to improved output coupling means therefore.

2. Description of the Prior Art

Present far infrared lasers, such as the 10.6 micron $CO_2$ laser, couple radiation out of the optical oscillator by means of a partially reflecting mirror which constitutes part of the resonant cavity. Such a partially reflecting mirrors have been constructed from materials such as NaCl and KCl, which transmit far infrared radiation with little absorption. Such "mirrors" rely upon the difference between their indices of refraction and that of air for their reflectivity. This difference is small and results in mirrors of low reflectivity. Furthermore, although the materials used to date have low absorption coefficients, these coefficients are much larger than those of transmitting materials utilized at visible optical frequencies. As a result, for high-power $CO_2$ lasers, the absorption of the $CO_2$ laser radiation is sufficient to heat and eventually damage or destroy the mirror. It is possible to increase the reflectivity of such mirrors by coating the surface with dielectric material. However, coatings presently available have even higher absorption coefficients and are destroyed by high-power laser radiation.

An alternative solution for producing a partially reflecting mirror in the far infrared has been to use a highly reflecting mirror (such as gold or copper) with a hole in it for coupling out the laser energy. If the hole is very small the output coupling is inefficient and large flux densities exist inside the laser cavity. In a high-power laser the internal flux density can damage and degrade the high reflectance surface of the mirror. If the output hole is made large the output coupling increases, but those modes (such as the fundamental mode) of the laser oscillator which have maxima in their electric field distributions at the site of the aperture suffer large losses compared to those modes of the oscillator which do not. The threshold (gain in the laser medium required to produce a net increase in amplitude for radiation making a single round trip inside the laser cavity) for those modes with maxima at the hole becomes higher than the threshold for modes without maxima at the hole. As a result, the oscillator operates in the latter set of modes; the output of the laser is again inefficient and high fluxes exist on the surface of the mirror, which, for high-power lasers, can damage the mirror.

One method of output coupling proposed in the art is coupling the radiation out of the oscillator through an array of very small holes over the entire mirror so that the relative thresholds of the various modes remain nearly unchanged. In this way, radiation can be coupled from the cavity for modes with maxima at the output holes thus eliminating high fluxes elsewhere on the mirror and producing efficient output coupling. Reflectivity can be controlled by the total area of the holes, but this has the additional problem of providing a highly divergent beam.

SUMMARY OF THE INVENTION

The object of the present invention is to provide distributed output coupling for a laser while maintaining a useful laser output beam.

According to the present invention, one mirror of a laser cavity comprises a Fresnel zone lens which permits coupling radiation out of the laser cavity in a distributed fashion across substantially the entire surface of the mirror, while at the same time providing a focusing of the radiation in the near field of the laser output. In accordance further with the present invention, the Fresnel zone lens may comprise a plurality of coupling holes in a reflective medium, the holes arranged in a Fresnel zone pattern. In accordance still further with the present invention, coupling may be effected by the provision of a plurality of reflective surfaces disposed on a transparent medium, such as a salt, so as to form a Fresnel zone pattern. In still further accord with the present invention, the mirror configuration may be of circular symmetry, or may be square, rectangular or of other known configurations, having an appropriate Fresnel zone pattern of either hole coupling or transparent window coupling.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
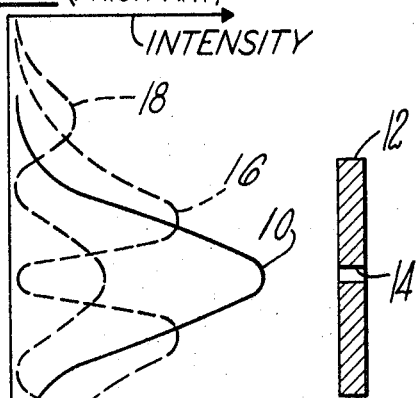
FIG. 1 is an illustration of first, second and third order modes plotted as a function of a transverse cross section of the optical axis of a laser, with the dimensions of the mirror superposed thereon.
Figure 2:
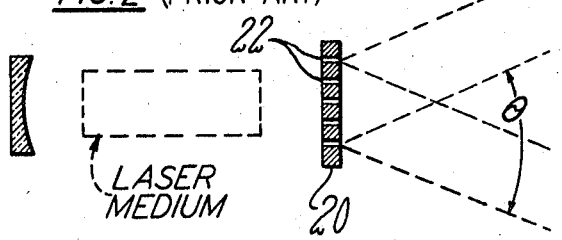
FIG. 2 is a schematic illustration of multiple-hole coupling lasers of the type known to the prior art.
Figure 5:
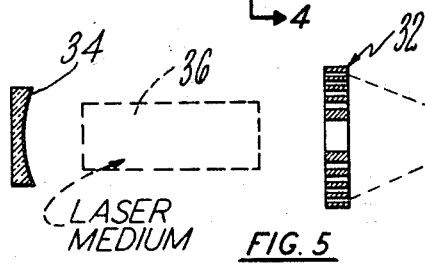
FIG. 5 is a schematic illustration of a laser employing the principles of the present invention, together with a collimating lens.

Referring now to FIG. 1, the difficulty with hole coupling known to the prior art is illustrated with respect to a cross section of laser radiation intensity of the various modes across a transverse section of the laser cavity. The dominant mode has a Gaussian distribution with its maxima at the axis of an optical cavity in the case where the laser comprises a concave mirror in combination with a flat mirror (as illustrated in FIGS. 2 and 5.). A portion of the energy falls in an area external to the useful reflective area of a flat mirror 12, but this is a small portion of the total energy since this energy is in the portion of the intensity distribution which is below 13 or 14 percent of the maximum intensity. Thus there is a substantial portion of the energy available to sustain oscillations within the optical cavity. The problem with prior art hole coupling of the type having a single hole 14 is that the output is coupled at a point of maximum intensity which provides a very high loss to the dominant mode 10; this results in a tendency for the energy to oscillate in the second order mode 16 since, in the second order mode, there is little or no energy at the center where the hole is. The laser cavity may tend to sustain oscillations in a mode which has the least losses, there being a natural tendency to maximize the efficiency of oscillations. The second order mode has more spillover than the first order mode, so normally the losses are greater for the second order mode and therefore it has a higher threshold in order to sustain oscillations than does the first order mode. In fact, depending upon the size of the mirror, the threshold may approach nearly double that for the first order mode; thus, the first order mode is normally much easier to sustain than the second order mode for a given degree of excitation of the laser medium. However, when the first order mode becomes very lossy due to hole coupling at the point of maximum intensity of the first order mode, then it is possible for the second order mode to oscillate with less losses than the first order mode; in which case, the second order mode takes over and the first order mode may be entirely lost. Of course, there are other modes possible, and assuming that the gain is sufficiently above threshold for each of the various modes, these modes may occur simultaneously within the cavity. The additional mode illustrated in FIG. 1 is the third order mode 18.

To overcome problems of interferring with the oscillation of the dominant mode which are created by axial hole coupling 14 as illustrated in FIG. 1, an attempt has been made to use multiple hole coupling as illustrated in FIG. 2. Therein, the mirror 20 is provided with a plurality of holes 22 distributed across the surface of the mirror so that effective output coupling is provided without disturbing the cavity mode structure. The distribution of coupling across the surface of the mirror causes the relative thresholds of the various modes to remain nearly unchanged. The holes 22 should be small compared to the mode size but large compared to a wavelength to avoid large beam divergences and waveguide effects which would produce phase shifts in the output radiation. For instance, in a 1 meter confocal resonator, at the $CO_2$ laser frequency, the diameter of the fundamental mode, as defined by a decrease to $1/e$ of the maximum electric field strength, is 3.5 mm. while the radiation wavelength is $1.06 \times 10^{12}$ mm. A convenient hole size might, therefore, be $5 \times 10^{11}$ mm. The disadvantage of coupling radiation through holes of this size is the resulting high divergence of the beam due to diffraction (in this case about 50 milliradians). Thus, distributed coupling known to the art has the disadvantage of providing a very wide, unresolved beam which is highly divergent. The divergence can be expressed with respect to the angle $\theta$ in the following relationship:

$$\theta = \frac{2.44\lambda}{D}$$

where $\lambda$ is the wave length and $D$ is the diameter of the holes 22. Naturally, the output beam is made up from the summation of all the various diverging beams from the individual holes.

This disadvantage can be overcome by not using a simple cluster of holes for output coupling. One embodiment of the invention, illustrated in FIG. 3, consists of a high reflectivity mirror, such as copper or gold, of circular symmetry having a plurality of coupling holes disposed therein in a plurality of concentric circles. The size of the hole is chosen as is known in the art, so as not to provide any waveguide effects to light passing therethrough. The hole size may typically be anything in excess of five or 10 times the wavelength. The location of the holes is chosen in accordance with the Fresnel assumption, wherein any phase shift of less than half a wavelength is ignored, so that the light reaching the point P is substantially in phase, thereby providing very high intensity at point P which is called the focal point of the Fresnel lens. Segments of, or complete concentric rings 26—30 are arranged as a Fresnel zone plate 32 which will focus the output energy. For $r_0=100\lambda$ the radiation from the various rings will arrive in phase at point P and produce a focus at $l_0=10^4\lambda$ or 10 cm. for 10.6 micron $CO_2$ laser radiation. If $r_1=142\lambda$, then $r_2=173\lambda$, $r_3=200\lambda$, $r_4=224\lambda$, $r_5=245\lambda$, $r_6=265\lambda$, $r_7=283\lambda$, and $r_8=300\lambda$. It is not necessary to use all possible "in phase" Fresnel zones, and some could be filled in to give the desired mirror reflectivity. In other words, a Fresnel zone pattern lens need not include all possible coupling, but one or more of the circles of holes as shown in FIGS. 3 and 4 could be eliminated so as to provide greater reflectivity without altering the location of the focus at the point P; of course, the coupling factor is decreased due to the lowering of transmissivity of the mirror by virtue of it having fewer coupling holes.

Referring now to FIG. 5, the Fresnel zone pattern coupling mirror 32 may be arranged with a concave mirror 34 so as to form a laser cavity around the laser medium 36. The output of the laser, passed through the coupling mirror 32, may be utilized at the focal point P, or a beam of low divergence 38 may be provided by inserting a suitable lens 40 in the path of the light outwardly of the focal point P. Thus, the laser in accordance herewith may be utilized in the near field with a local focal point, or by the use of the lens 40, may find application in its far field through a beam of light provided with low divergence as a result of the lens and Fresnel coupling combination.

Figure 3:
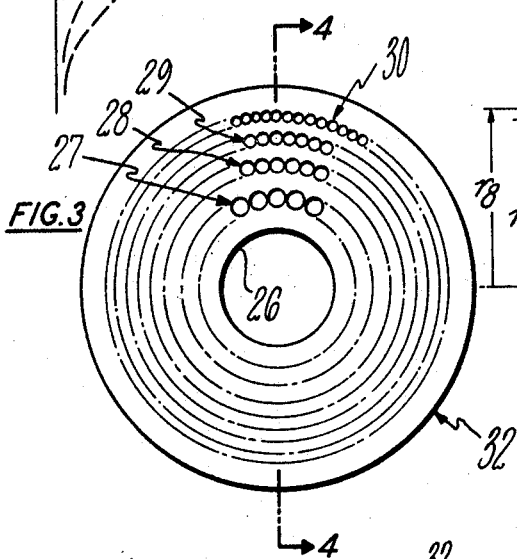
FIG. 3 is a side elevation of a Fresnel zone pattern coupling mirror of circular symmetry in accordance with one embodiment of the present invention.
Figure 4:
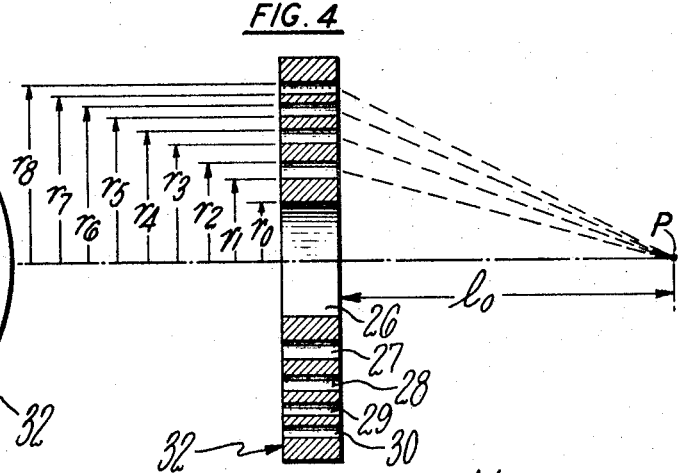
FIG. 4 is a cross section of the Fresnel zone pattern array illustrated in FIG. 3.
Figure 6:
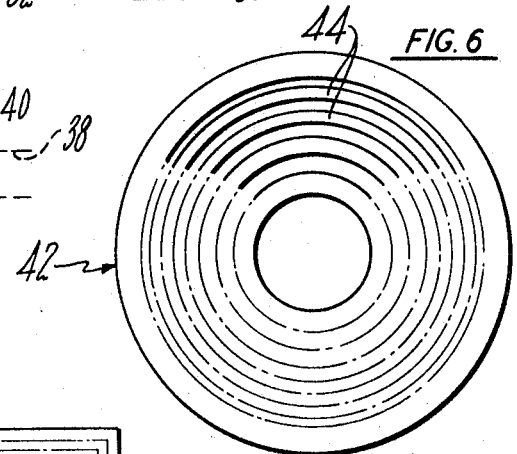
FIG. 6 is a side elevation view of an alternative to the embodiment of FIG. 3.

An alternative to the embodiments shown in FIGS. 3—5 is illustrated in FIG. 6. Therein, instead of a plurality of holes arranged in concentric rings, alternative rings of transmissivity and reflectivity are provided by utilizing a lens composed of a transmissive material such as salt (NaCl or KCl) which has a very low absorption characteristic and can be acceptable in some applications. Disposed on the transmissive mirror are a plurality of concentric rings of reflective material 44 which may comprise deposited copper, gold, aluminum or other such material. The cross section of the reflective material 44 has an appearance similar to FIG. 4, and the transmissive material is continuous across the cross section of the mirror 42.

Figure 7:
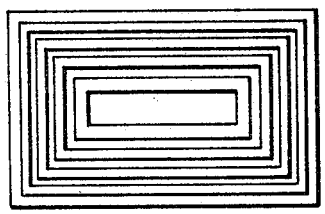
FIGS. 7 and 8 are side elevation views of rectangular versions of the embodiments shown in FIGS. 6 and 3, respectively.
Figure 8:
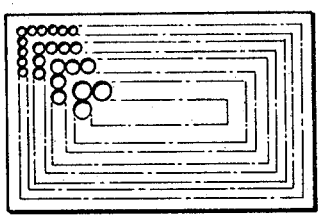

FIGS. 7 and 8 illustrate the fact that the embodiments described hereinbefore may be modified so as to provide configurations other than circular symmetry, as desired for any given utilization of the present invention. In the embodiment of FIG. 8, a plurality of holes arranged in concentric rectangles (similar to the holes in FIG. 3), whereas in FIG. 7 a transmissive material has applied thereon strips of reflective material in a plurality of concentric rectangles. A wide variety of other forms of physical configuration can obviously be provided to suit various implementations of the present invention.

Although the invention has been shown and described with respect to preferred embodiments thereof, it should be understood by those skilled in the art that the foregoing and other various changes and omissions in the form and detail thereof may be made therein without departing from the spirit and the scope of the invention.

Having thus described typical embodiments of our invention, that which we claim as new and desire to secure by Letters Patent of the United States is:

We claim:

1. In a laser comprising a concave mirror and a flat mirror axially aligned on opposite sides of a lasing medium so as to form a laser cavity, the improvement which comprises:
said flat mirror comprising a reflective material having a plurality of holes therein arranged in a Fresnel zone pattern, whereby said mirror provides output coupling with focusing of the laser output at a point in the near field thereof.